(12) United States Patent
Swaney

(10) Patent No.: US 6,616,507 B1
(45) Date of Patent: Sep. 9, 2003

(54) CENTRIFUGAL HONEY EXTRACTOR

(76) Inventor: Frederick J. Swaney, 112 Rollingwood Trail, Sharpsburg, GA (US) 30277

( * ) Notice: Subject to any disclaimer, the term of this patent is extended or adjusted under 35 U.S.C. 154(b) by 0 days.

(21) Appl. No.: 10/045,939

(22) Filed: Oct. 19, 2001

Related U.S. Application Data (60) Provisional application No. 60/241,956, filed on Oct. 20, 2000.

(51) Int. Cl.[7] .......................... A01K 59/00; B01D 35/00
(52) U.S. Cl. ......................................... 449/53; 210/361
(58) Field of Search .............................. 449/51, 53, 54, 449/55; 460/88; 210/781

(56) References Cited

U.S. PATENT DOCUMENTS

| | | | |
|---|---|---|---|
| 1,730,593 A | 10/1929 | Root | |
| 1,791,605 A | 2/1931 | Root | |
| 3,007,255 A | * 11/1961 | Mandrapa | 210/361 |
| 3,351,273 A | * 11/1967 | Harrison | 210/361 |
| 4,148,733 A | 4/1979 | Gamble | |
| 4,280,236 A | * 7/1981 | Herman | 449/53 |
| 4,310,119 A | 1/1982 | Culhane | |
| 4,776,051 A | * 10/1988 | Syme | 449/53 |

* cited by examiner

Primary Examiner—Charles T. Jordan
Assistant Examiner—Elizabeth Shaw (57) ABSTRACT

A centrifugal honey extractor comprising: (a) a frame supporting apparatus (12), and (b) an outer support structure (10). The outer support structure (10) provides vertical and lateral support for a removable flexible membrane (26) which becomes the inner wall of the outer support structure (10) and the surface which collects the honey as it is flung outwardly by centrifugal force from the honeycomb. The frame supporting apparatus (12) is constructed with a rigid annular cylinder center support (12d), which provides a non-flexible rotating apparatus that can be supported entirely by the top of the outer support structure (10). During operation the extracted honey will collect against the removable flexible membrane (26) where it will flow downwardly and through the outlet opening (32) in the bottom of the outer support structure (10). After the honey extraction operation the removable flexible membrane (26) is discarded eliminating the cleaning of the outer container.

3 Claims, 5 Drawing Sheets

CENTRIFUGAL HONEY EXTRACTOR

CROSS REFERENCE TO RELATED APPLICATION

This application claims the benefit of Provisional Patent Application Serial No. 60/241,956 filed Oct. 20, 2000.

FEDERALLY SPONSORED RESEARCH

Not Applicable

SEQUENCE LISTING OR PROGRAM

Not Applicable

1. Background—Field of the Invention

This invention relates to honey extraction devices and specifically to such devices which operate under centrifugal force to effect honey extraction.

2. Background—Description of Related Art

Hobbyist and small apiary honey production generally relies on centrifugal extraction of the honey from the individual super frames. The honey extractor requires cleaning before use to remove foreign material induced from storage and handling. A second cleaning is required after use to remove honey, hive debris and wax from the extractor before storage. Equipment cleaning can be a substantial part of the honey collection effort due to the multiple parts of the conventional extractor and the difficulty of cleaning each individual part. The large outer support and storage container with honey outlet fittings and shaft bearing fixtures makes a thorough cleaning difficult and time-consuming.

Centrifugal honey extractors are the subject of a number of U.S. patents. A review of this prior art reveals a number of extractors, which teach the arranging of the comb frames along arcuately spaced radial paths around a central shaft within a container. U.S. Pat. Nos. 1,730,593 and 1,791,605 to H. Root, which teaches the radial placement of the comb frames around a central shaft. U.S. Pat. No. 4,148,733 to Gamble, which teaches a simplification of the extractor frame supporting mechanism around a central shaft eliminating the necessity of a retaining basket as part of the rotating mechanism. U.S. Pat. No. 4,310,119 to Culhane, which teaches limiting the surfaces of the extractor which come in direct contact with the honey to only those parts which move to the next production step (as in a large honey production operation).

All honey extractors heretofore known suffer from a number of disadvantages:

(a) the outer container which provides structural support, acts as the bottom bearing surface for the central shaft of the rotating frame support and also acts as a collection and retention container for the extracted honey. Since honey is in direct contact with each device all the parts must be cleaned after each use;

(b) the rotating frame support is supported by the bottom of the outer container, which immerses load bearing rotating surfaces in the honey. Wear material from the bearing surfaces can contaminate the honey. Local heating at the bearing surfaces can degrade the honey;

(c) the outer container is in direct contact with the honey and therefore must be fabricated of materials accepted in the food service industry. These materials, primarily types of stainless steel or plastic, are costly to fabricate into a leak free container.

(d) the outer container generally can not be disassembled for storage.

OBJECTS AND ADVANTAGES

Accordingly, several objects of the present invention include:

(a) to provide a honey extractor in which the honeycomb frames are supported entirely by the top of the outer supporting structure or outer container;

(b) to provide a honey extractor with a removable membrane lining such that the honey avoids contact with the outer supporting structure or outer container;

(c) to provide a honey extractor which can be easily cleaned;

(d) to provide a honey extractor that the outer container or supporting structures can be dismantled for storage;

(e) to provide a honey extractor which can be designed for use by the hobbyist or home operator.

Further objects and advantages are to provide a honey extractor in which the honeycomb frames are supported by the top of the outer container. A top support, without a bottom pivot or bearing, allows a disposable liner to be placed inside the container. The disposable liner can be removed and discarded eliminating the cleaning of the outer container. Still further objects and advantages will become apparent from a consideration of the ensuing description and drawings.

SUMMARY

In accordance with the present invention the centrifugal honey extractor is an extractor operated on the centrifugal principal with the honeycomb frames supported in a rigid radial array. A removable plastic membrane, which lines the inside surfaces of the honey extractor, can be discarded after use to avoid cleaning. A new plastic membrane is installed before use, preventing honey contamination and degradation from contaminants introduced during seasonal storage of the extractor components.

DRAWINGS

Drawing figures

| Reference Numerals in Drawings | | | |
|---|---|---|---|
| 10 | outer support structure | 12 | frame supporting apparatus |
| 12a | upper support plate | 12b | upper frame retaining plate |
| 12c | lower frame retaining plate | 12d | annular cylinder center support |
| 12e | slots | 12f | apertures |
| 12g | shaft | 12h | upper beam |
| 12i | fastening nut | 12j | access opening |
| 12k | electric motor | 12m | gears |
| 12n | hand crank | 14 | honeycomb frames |
| 14a | top bar | 14b | top bar extension |
| 16 | outer support wall | 18 | wall retaining groove |
| 20 | top support plate | 22 | bottom support, plate |
| 24 | support members | 26 | removable flexible membrane |
| 26a | removable flexible membrane | 26b | removable flexible membrane |
| 28 | removable retaining ring | 28a | removable retaining ring |
| 28b | removable retaining ring | 30 | fixed retaining ring |
| 30a | fixed retaining ring | 30b | fixed retaining ring |
| 32 | outlet opening | 34 | outlet support funnel |
| 36 | outlet retaining ring | 36a | outlet retaining ring |
| 36b | outlet retaining ring | 38 | outlet retaining groove |
| 48 | container with flat bottom | 48a | container with shaft bearing |
| 50 | discharge honey gate | 50a | discharge honey gate |
| 52 | retaining ring | 54 | shaft |
| 56 | shaft retainer | 58 | shaft bearing |
| 60 | prior art frame supporting apparatus | | |

DETAILED DESCRIPTION

Description—FIGS. 1, 2, 3 and 4—Preferred Embodiment

Figure 1:
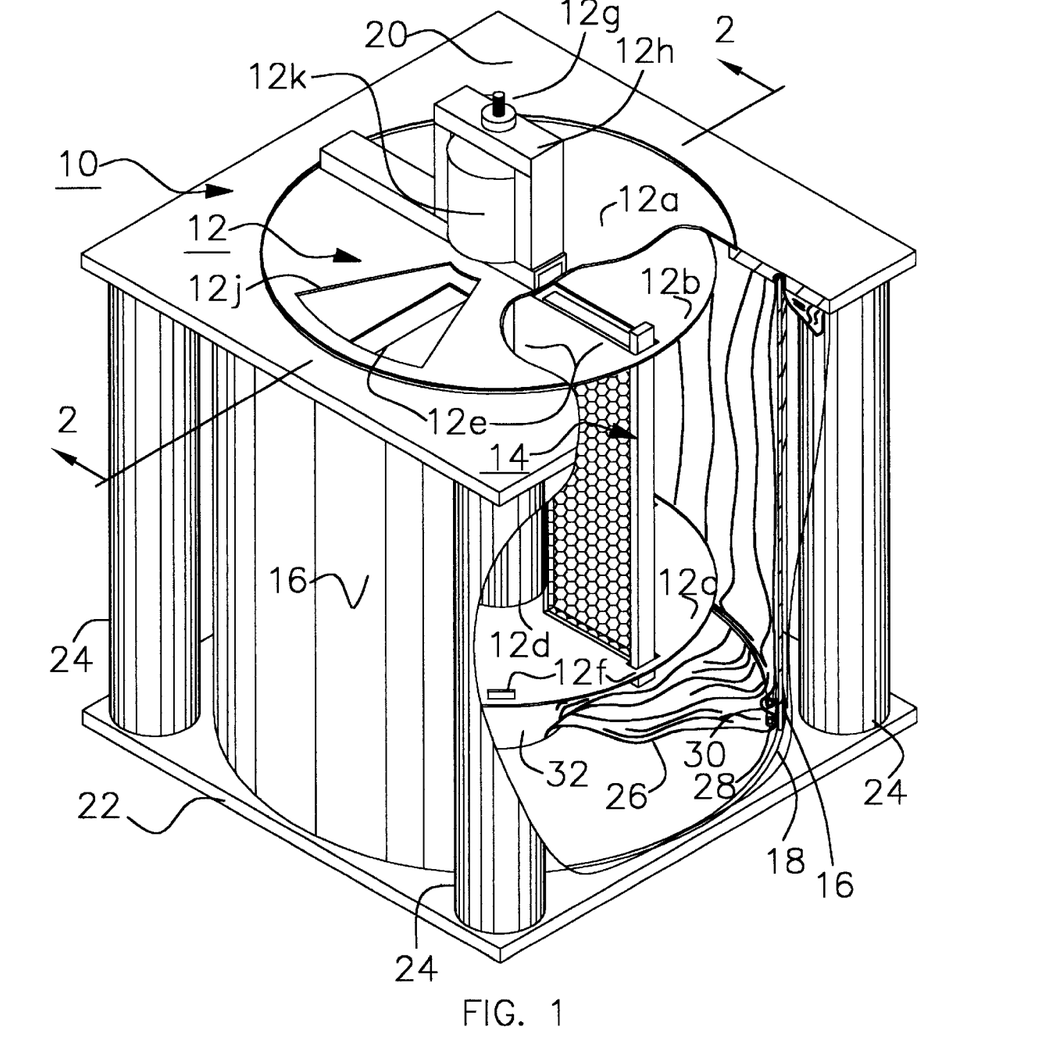
FIG. 1 is a perspective view of my honey extractor with a cutaway showing a portion of the interior.
Figure 2:
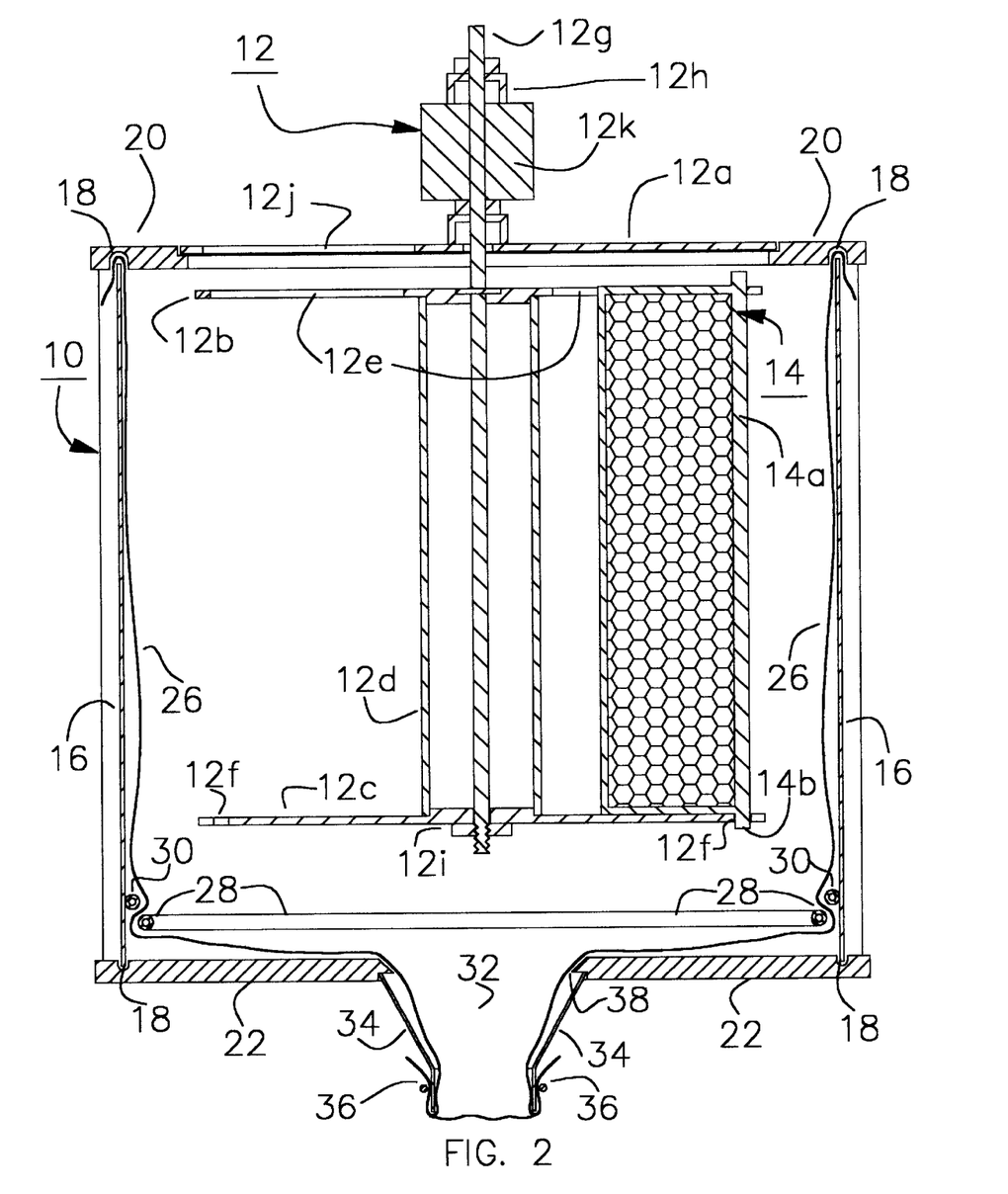
FIG. 2 is a cross section view of the portion indicated by the section lines 2—2 in FIG. 1.
Figure 3:
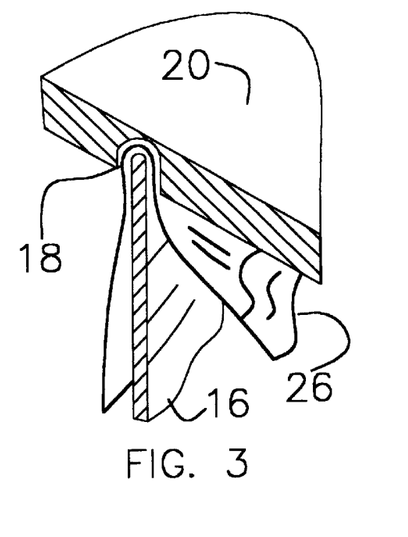
FIG. 3 is a perspective view partial enlargement of the top support plate wall retaining groove detail in FIG. 1.
Figure 4:
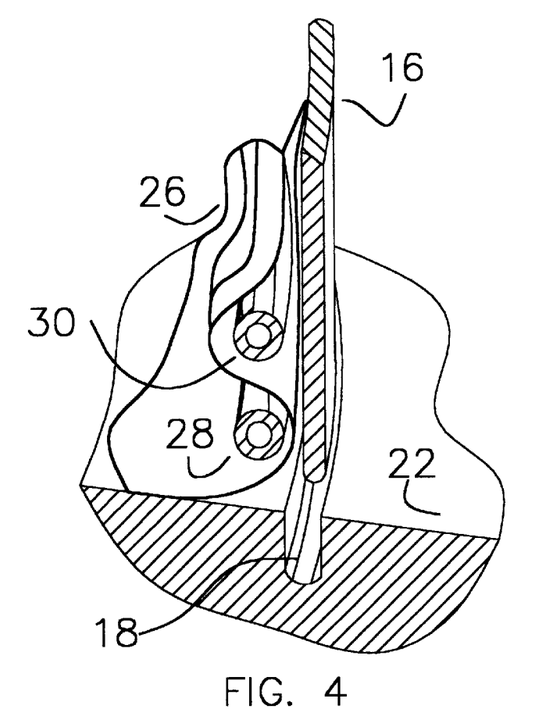
FIG. 4 is a perspective view partial enlargement of the bottom support plate wall retaining groove detail, and the fixed and removable retaining ring detail in FIG. 1.

A preferred embodiment of the centrifugal honey extractor of the present invention is illustrated in the perspective view of FIG. 1, the section view of FIG. 2, and the enlarged perspective views FIGS. 3 and 4. The honey extractor includes a supporting frame, structure, outside support, or outer support structure 10 and a honeycomb support, honeycomb frame support, or frame supporting apparatus 12 which supports several honeycomb frames. Only a single honeycomb frame of several honeycomb frames 14 is shown in FIG. 1 and also in FIG. 2 for clarity. The outer support structure 10 includes a cylindrical outer support element or outer support wall 16 made of sheet material of the proper height and length to be retained by a circular wall retaining device or wall retaining groove 18 placed at the proper location into a top support element, or top support plate 20 and a bottom support element or bottom support plate 22.

The outer support wall 16 construction materials such as wire mesh, hardware cloth, or thin sheet plastic, ferrous, or non-ferrous material may be incapable of directly supporting the top support plate 20 and the frame supporting apparatus 12. Beams, columns, or other shaped structural members additionally can be used to provide additional support, parallel alignment and vertical spacing of the top support plate 20 and the bottom support plate 22. This additional support in this embodiment is shown as a group of support members 24 made of thin strong cylindrical material such as plastic drainpipe. A removable flexible membrane 26 covers the interior of the outer support wall 16 and the top surface of the bottom support plate 22. The top of the removable flexible membrane 26 is held in place by passing between the outer support wall 16 and the wall retaining groove 18 in the top support plate 20. The removable flexible membrane 26 then passes between a flexible removable retaining ring 28 inside the removable flexible membrane 26 and outside a fixed retaining ring 30 which is attached to the outer support wall 16. The removable retaining ring 28 inside the removable flexible membrane 26 captures the removable flexible membrane 26 against the fixed retaining ring 30 and provides tension in the removable flexible membrane 26. The retention provided prevents the removable flexible membrane 26 from coming into contact with the frame supporting apparatus 12.

The removable flexible membrane 26 then passes through an outlet opening 32 placed in one of several positions in the bottom support plate 22 which include the central position, and is folded over the outer surface of a outlet structure, outlet shaping element, or outlet support funnel 34. An outlet retaining device, or outlet retaining ring 36 captures the removable flexible membrane 26 between the outlet support funnel 34 and the outlet retaining ring 36. The tension provided by the outlet retaining ring 36 causes the removable flexible membrane 26 to conform to the shape of the outlet support funnel 34 and provide the opening for the outward flow of extracted honey. The outlet support funnel 34 is held in position by a stop, projection, retaining plate, or outlet retaining groove 38 placed into the bottom support plate 22, and by the upward force of the tension created in the removable flexible membrane 26.

The frame supporting apparatus 12 is separate and removable from the outer support structure 10. The frame supporting apparatus 12 includes an upper support plate 12a, an upper frame retaining plate 12b and a lower frame retaining plate 12c which are securely mounted on the respective ends of an annular cylinder center support or center support 12d. A series of arcuately spaced, radially extending slots 12e are placed through the surface of the upper frame retaining plate 12b such that their positions correspond to a series of arcuately spaced apertures 12f in the surface of the lower frame retaining plate 12c as in prior art. The annular cylinder center support 12d and the upper frame retaining plate 12b and the lower frame retaining plate 12c are arranged such that each aperture 12f underlies the outer end of one of the slots 12e, and each corresponding slot and aperture pair cooperate to support the honeycomb frames 14 therein during the extraction process as in the prior art. A rotatable, vertical, axial, shaft 12g extends though an upper beam 12h and the upper support plate 12a to allow its rotation and total support of the vertical downward and rotating load of the frame supporting apparatus 12. In the preferred embodiment the shaft 12g extends through the upper beam 12h, upper support plate 12a, upper frame retaining plate 12b, annular cylinder center support 12d and the lower frame retaining plate 12c and centrally fastened to support and transmit torque to the lower frame retaining plate 12c and the honeycomb frames 14. In the preferred embodiment a retaining nut, fastening device, or fastening nut 12i on the shaft 12g is removable, allowing disassembly of the frame supporting apparatus 12 for cleaning and storage. An access opening 12j is placed through the upper support plate 12a such that the slots 12e in the upper frame retaining plate 12b can underlie the access opening 12j for access to and emplacement and removal of the honeycomb frames 14.

A circular opening is placed in the surface of the top support plate 20 with a diameter slightly greater that the upper frame retaining plate 12b of the frame supporting apparatus 12 but a diameter less than the upper support plate 12a of the frame supporting apparatus 12. The frame supporting apparatus 12 is centered over the circular opening in the top support plate 20 with the honeycomb frames 14 and the upper frame retaining plate 12b and the lower frame retaining plate 12c extending through the circular opening in the top support plate 20. The frame supporting apparatus 12 is positioned such that the upper frame retaining plate 12b is below the edge of the outer support wall 16. The fixed retaining ring 30 is positioned such that the lower frame retaining plate 12c is a sufficient distance above the removable flexible membrane 26 and the bottom support plate 22 so that during rotation of the frame supporting apparatus 12 the frame supporting apparatus 12 does not contact the removable flexible membrane 26. In the preferred embodiment a central opening in the top support plate 20 with a counterbored surface of a diameter slightly greater than the upper support plate 12a into which the frame supporting apparatus 12 is supported in central alignment. Alignment pins and holes or other centering and fastening devices could also be used to provide central alignment of the frame supporting apparatus 12 in the central opening in the top support plate 20.

Rotation of the shaft 12g and the frame supporting apparatus 12 with the honeycomb frames 14 is provided by any of several known elements, which include an electric motor 12k in the preferred embodiment.

Advantages

From the description above a number of advantages of my centrifugal honey extractor become evident:

(a) The frame supporting apparatus 12 is supported entirely by the top support plate 20 of the outer support structure 10 avoiding the need for a bottom support or antifriction surface. This avoids possible contamination of the honey product with the antifriction surface wearing out products and provides the ability to dispose of the removable flexible membrane 26 after use, avoiding the cleaning of the outer support structure 10.

(b) The frame supporting apparatus 12 can be fabricated so as to be disassembled for cleaning and storage.

(c) The outer support wall 16 can be fabricated from porous materials such as hardboard or cardboard, open weave materials such as wire mesh, or materials which might contaminate the honey product since the honey product avoids contacting the side or bottom of the outer support structure 10.

(d) The outer support structure 10 can avoid the need for a liquid tight container requiring special fabrication, testing techniques and materials of construction that are compatible with food service applications.

(e) The outer support structure 10 can be disassembled for storage.

(f) The outer support wall 16 can be fabricated of flat sheet material avoiding the storage space of a conventional cylindrical container.

(g) The removable flexible membrane 26 is a disposable item which can be upgraded to future new food handling materials avoiding the replacement or upgrading of the outer support structure 10.

Operation—FIGS. 1, 2, 3 and 4—Preferred Embodiment

To prepare the honey extractor of my invention for use the frame supporting apparatus 12 is assembled by placing the upper frame retaining plate 12b, annular cylinder center support 12d and the lower frame retaining plate 12c on to the shaft 12g and tightening the fastening nut 12i. The sheet material of the outer support wall 16 is formed into a right circular cylinder and placed in the wall retaining groove 18 of the bottom support plate 22. The support members 24 are fastened on the bottom support plate 22. The fixed retaining ring 30 is fastened in position to the inside surface of the outer support wall 16. The removable flexible membrane 26 is then placed to cover the inside surface of the outer support wall 16 and pass through the outlet opening 32. The edge of the removable flexible membrane 26 is now rolled over the top edge of the outer support wall 16. The top support plate 20 is then placed to capture the removable flexible membrane 26 between top edge of the outer support wall 16 and the wall retaining groove 18 of the top support plate 20. The support members 24 are fastened on the top support plate 20. The removable retaining ring 28 is placed through the central opening in the surface of the top support plate 20 on the inside surface of the removable flexible membrane 26 and slid down the inside surface of the removable flexible membrane 26 and the outer support wall 16 into position below the fixed retaining ring 30, causing the removable flexible membrane 26 to conform to the inside surface of the outer support wall 16. The bottom of the removable flexible membrane 26 extending through the outlet opening 32 in the bottom support plate 22 is passed through the outlet support funnel 34 and the outlet support funnel 34 placed into the outlet retaining groove 38 in the bottom support plate 22. The bottom edge of the removable flexible membrane 26 is rolled over the outlet support funnel 34 and held in position by the outlet retaining ring 36. The previously assembled frame supporting apparatus 12 is placed in the central opening of top support plate 20. This prepares the honey extractor for use.

The manner of using the honey extractor of my invention is similar to conventional centrifugal honey extractors in present use. Namely the honeycomb frames 14 are inserted through the access opening 12j and into the slots 12e in the frame supporting apparatus 12. A top bar 14a of the honeycomb frame 14 is placed so that a top bar extension 14b of the honeycomb frame 14 is positioned in the apertures 12f of the frame supporting apparatus 12. The honeycomb frames 14 are then rotated, by electric motor power in the preferred embodiment, at a speed adequate to cause the honey to flow from both sides of the combs simultaneously by centrifugal force. The extracted honey will be thrown across the open space between the frame supporting apparatus 12 and the removable flexible membrane 26. The honey will collect against the removable flexible membrane 26 where it will flow downwardly and through the outlet opening 32 of the outer support structure 10 which supports and maintains tension in the removable flexible membrane 26. The outer support structure 10 thereby avoids coming into direct contact with the extracted honey.

At the completion of the extracting process the empty honeycomb frames are removed. The frame supporting apparatus 12 is then removed and, in the preferred embodiment, can be disassembled in the reverse manner in which it was assembled. The top support plate 20 of the outer support structure 10 is removed to release the labyrinth type capture of the top of the removable flexible membrane 26. The removable flexible membrane 26 can then be released from the side of the outer support wall 16 by removing the removable retaining ring 28. The removable flexible membrane 26 is then held over the outlet opening 32 and allowed to drain free of honey or can be manually squeezed to remove additional excess honey that might cling to the sides of removable flexible membrane 26. The removable flexible membrane 26 is then released by removing the outlet retaining ring 36 and pulled through the outlet opening 32 and discarded. The fixed retaining ring 30 can then be removed form the outer support wall 16 and the outer support wall 16 removed from the bottom support plate 22. The support members 24 are then removed from the bottom support plate 22. The individual components can then be stored.

In the preferred embodiment only two to six honeycomb frame positions are allotted in the frame supporting apparatus 12 to maintain the relatively small size and permit manual rotation. If the extractor is not to be used to full capacity the honeycomb frames must be placed in a balanced relationship to minimize unbalanced rotational forces.

The capacity of the extracting apparatus outer support structure 10 may be increased to commercial usage without departing from the scope of the claims. However, it is felt that a capacity of four to six frames is most efficient and economical for the small apiary.

Figure 5:
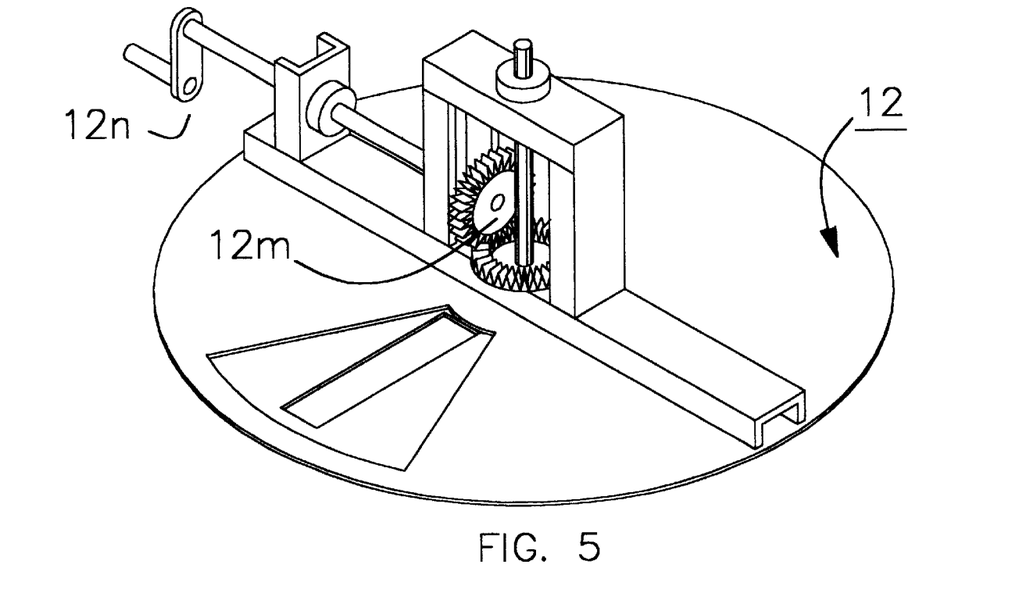
FIG. 5 shows a perspective view of a hand powered alternative embodiment.
Figure 6:
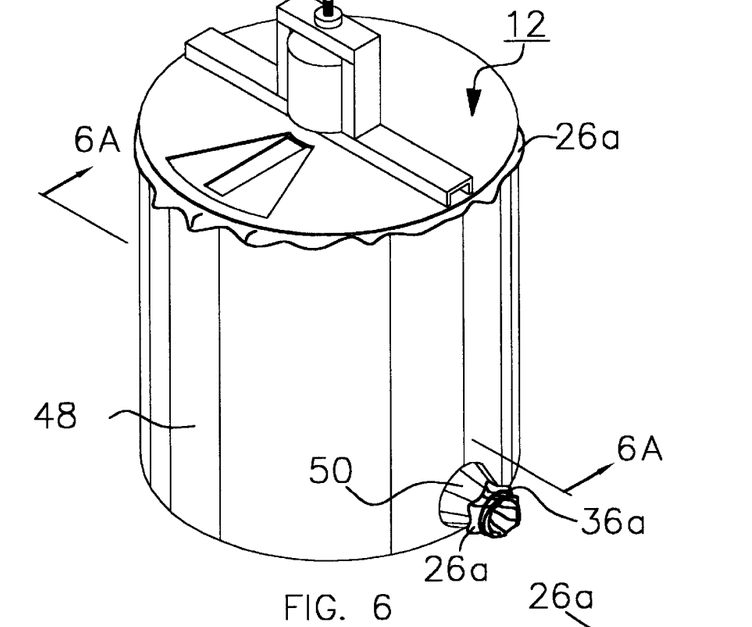
FIG. 6 shows a perspective view of an alternative embodiment with an alternate container.
Figure 6A:
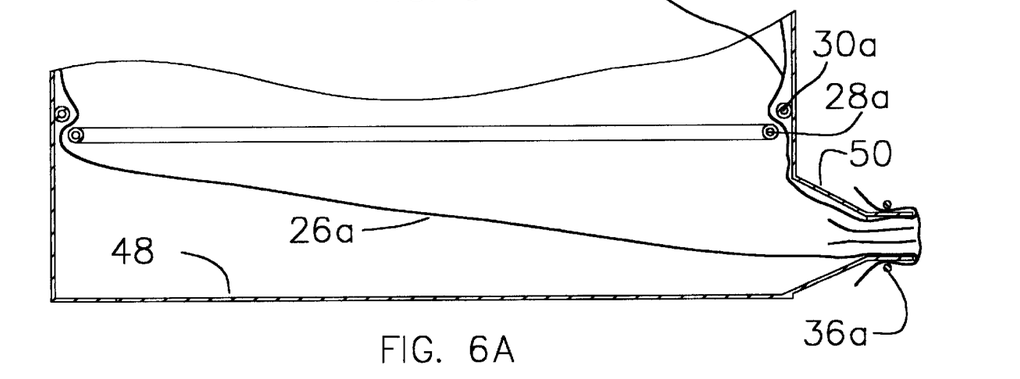
FIG. 6A is a cross section view of the portion indicated by the section lines 6A—6A in FIG. 6 of the alternative embodiment using an alternate container with a flat bottom wall and alternate side outlet opening.

FIGS. 5, 6 and 6A—Alternative Embodiments

There are various possibilities with regard to the choice of elements to provide rotation, and the choice of elements to support the removable flexible membrane.

Description—FIG. 5—Hand Operation Alternative Embodiment

In FIG. 5 the rotation of the frame supporting apparatus with honeycomb frames is provided by any of several known elements which include manual rotation with a hand crank 12n and several gears 12m.

Operation—FIG. 5—Hand Operation Alternative Embodiment

The operation of the hand operation alternative embodiment is substantially the same as the preferred embodiment, with the rotation of the frame supporting apparatus with honeycomb frames provided by hand power rather than electric power.

Description—FIGS. 6 and 6A—Outer Support Structure Alternative Embodiment In FIG. 6 the outer support structure 10 of FIGS. 1, 2, 3, and 4 is provided by a conventional honey extractor container, barrel, drum, or container with flat bottom 48, and with side and bottom walls strong enough to support the frame supporting apparatus 12 and a removable flexible membrane 26a. FIG. 6 also shows an alternate outlet opening, discharge valve, or discharge honey gate 50 placed in one of several positions in the side and bottom walls of the container with flat bottom 48 which include the position in the side wall shown in FIG. 6.

The removable flexible membrane 26a covers the inside walls and bottom wall of the container with flat bottom 48. The top of the removable flexible membrane 26a is held in place by passing between the top edge of the container with flat bottom 48 and the 12. The removable flexible membrane 26a then passes between a flexible removable retaining ring 28a inside the removable flexible membrane 26a and outside a fixed retaining ring 30a which is attached to the inside surface of the outer wall of the container with flat bottom 48. The removable retaining ring 28a inside the removable flexible membrane 26a captures the removable flexible membrane 26a against the fixed retaining ring 30a and provides tension in the removable flexible membrane 26a. The retention provided prevents the removable flexible membrane 26a from coming into contact with the frame supporting apparatus 12. The fixed retaining ring 30a is positioned such that the lower frame retaining plate 12c is a sufficient distance above the removable flexible membrane 26a and bottom wall of the container with flat bottom 48 such that during rotation of the frame supporting apparatus 12 the frame supporting apparatus 12 does not contact the removable flexible membrane 26a.

The removable flexible membrane 26a then passes through the discharge honey gate 50, and is folded over the outer surface of the discharge honey gate 50. An outlet retaining ring 36a captures the removable flexible membrane 26a between the discharge honey gate 50 and the outlet retaining ring 36a. The tension provided by the outlet retaining ring 36a causes the removable flexible membrane 26a to conform to the shape of the discharge honey gate 50, and provide the opening for the outward flow of extracted honey.

Operation—FIGS. 6 and 6A—Outer Support Structure Alternative Embodiment

To prepare the alternative embodiment of FIGS. 6 and 6A for use the frame supporting apparatus 12 is assembled as in the preferred embodiment. The fixed retaining ring 30a is fastened in position to the inside surface of the container with flat bottom 48. The removable flexible membrane 26a is then placed to cover the inside surface of the container with flat bottom 48 and pass through the discharge honey gate 50. The edge of the removable flexible membrane 26a is now rolled over the top edge of the container with flat bottom 48. The removable retaining ring 28a is placed through the central opening of the container with flat bottom 48 and on the inside surface of the removable flexible membrane 26a and slid down the inside surface of the removable flexible membrane 26a into position below the fixed retaining ring 30a, causing the removable flexible membrane 26a to conform to the inside surface of the container with flat bottom 48. The frame supporting apparatus 12 is then placed to capture the removable flexible membrane 26a between top edge of the container with flat bottom 48 and the frame supporting apparatus 12. The removable flexible membrane 26a is then extended through the discharge honey gate 50. The edge of the removable flexible membrane 26 is rolled over the discharge honey gate 50 and held in position by the outlet retaining ring 36a. This prepares the honey extractor for use.

The manner of using this alternate embodiment of the honey extractor of my invention is the same as the preferred embodiment, with the container with flat bottom 48 providing the support for the frame supporting apparatus 12, in place of the outer support structure 10 in the preferred embodiment.

Figure 7:
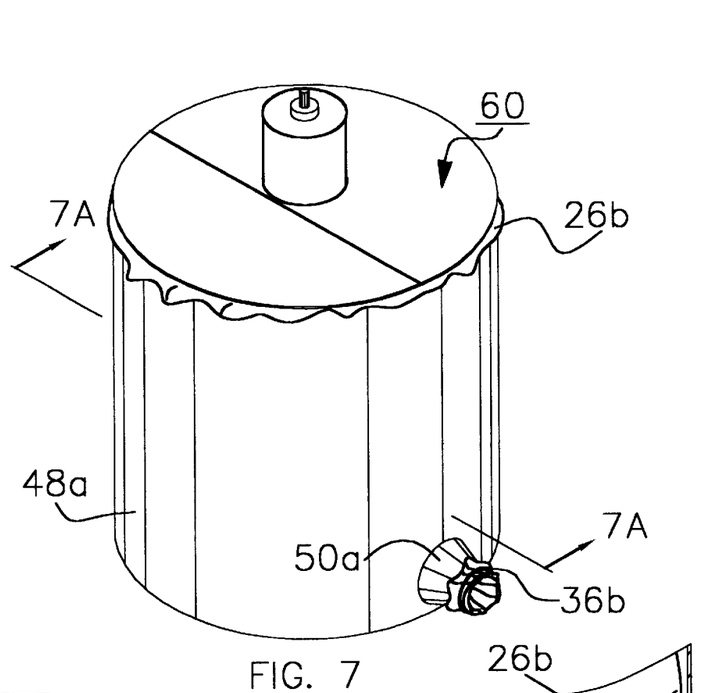
FIG. 7 is a perspective view of an alternative embodiment with an alternate container and a prior art frame supporting apparatus.
Figures 7A, 7B:
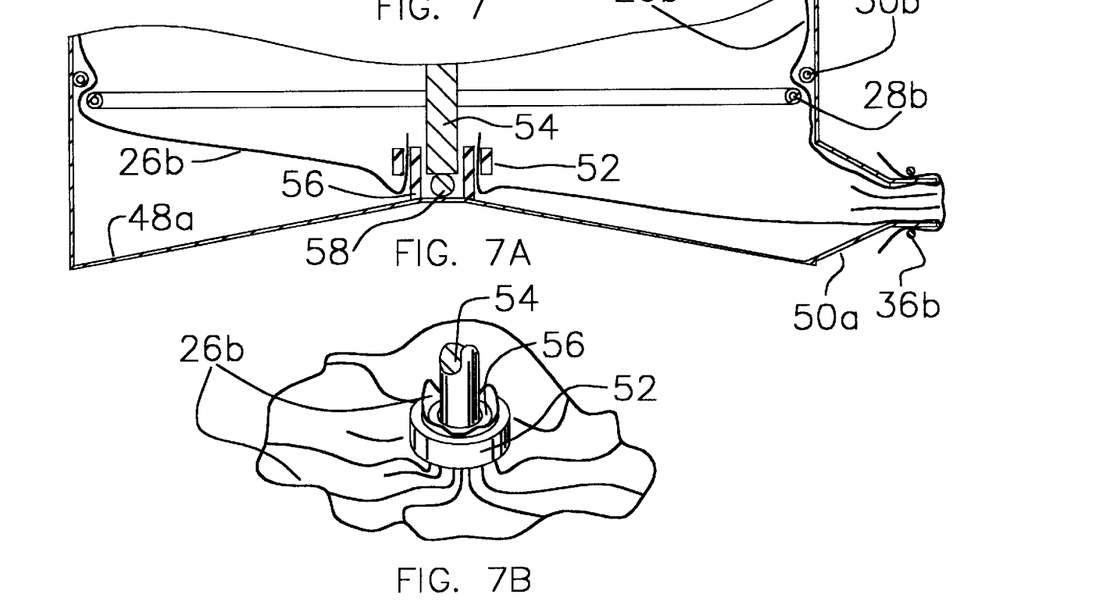
FIG. 7A is a cross section view of the portion indicated by the section lines 7A—7A in FIG. 7 of the alternative embodiment using an alternate container with a raised bottom wall and alternate side outlet opening.
FIG. 7B is a perspective view partial enlargement of the shaft bearing guide, shaft bearing, and the removable flexible membrane retaining ring shown in FIG. 7A.

Description—FIGS. 7, 7A, and 7B—Bottom Support Bearing Alternative Embodiment In FIGS. 7, 7A and 7B the outer support structure 10 of FIGS. 1, 2, 3, and 4 is provided by a conventional honey extractor container with a bottom shaft bearing, or container with shaft bearing 48a, and a prior art frame supporting apparatus 60 with a shaft 54, supported by the container with shaft bearing 48a. FIG. 7 also shows an alternate outlet opening, discharge valve, or discharge honey gate 50a placed in one of several positions in the side and bottom walls of the container with shaft bearing 48a which include the position in the side wall shown in FIG. 7.

A removable flexible membrane 26b covers the inside walls and bottom wall of the container with shaft bearing 48a. The top of the removable flexible membrane 26b is held in place by passing between the top edge of the container with shaft bearing 48a and the prior art frame supporting apparatus 60. The removable flexible membrane 26b then passes between a flexible removable retaining ring 28b inside the removable flexible membrane 26b and outside a fixed retaining ring 30b which is attached to the inside surface of the outer wall of the prior art frame supporting apparatus 60. The removable retaining ring 28b inside the removable flexible membrane 26b captures the removable flexible membrane 26b against the fixed retaining ring 30b and provides tension in the removable flexible membrane 26b. The retention provided prevents the removable flexible membrane 26b from coming into contact with the prior art frame supporting apparatus 60. The fixed retaining ring 30b is positioned such that the prior art frame supporting apparatus 60 is a sufficient distance above the removable flexible membrane 26b and bottom wall of the container with shaft bearing 48a such that during rotation of the prior art frame supporting apparatus 60, the prior art frame supporting apparatus 60 does not contact the removable flexible membrane 26b.

The removable flexible membrane 26b is captured between a shaft retainer 56, which is part of the container with shaft bearing 48a, and a retaining device, or retaining ring 52. The shaft 54 of the 60 passes through a hole in the removable flexible membrane 26b and into the shaft retainer 56 and is supported by a shaft bearing 58.

The removable flexible membrane 26b then passes through the discharge honey gate 50a, and is folded over the outer surface of the discharge honey gate 50a. An outlet retaining ring 36b captures the removable flexible membrane 26b between the discharge honey gate 50a and the outlet retaining ring 36b. The tension provided by the outlet retaining ring 36b causes the removable flexible membrane 26a to conform to the shape of the discharge honey gate 50a, and provide the opening for the outward flow of extracted honey.

Operation—FIGS. 7, 7A, and 7B—Bottom Support Bearing Alternative Embodiment

To prepare the alternative embodiment of FIGS. 7, 7A and 7B for use the fixed retaining ring 30b is fastened in position to the inside surface of the container with shaft bearing 48a. The removable flexible membrane 26b is then placed to cover the inside surface of the container with shaft bearing 48a and pass through the discharge honey gate 50a. The edge of the removable flexible membrane 26b is now rolled over the top edge of the container with shaft bearing 48a. The removable retaining ring 28b is placed through the central opening of the container with shaft bearing 48a and on the inside surface of the removable flexible membrane 26b and slid down the inside surface of the removable flexible membrane 26b into position below the fixed retaining ring 30b, causing the removable flexible membrane 26b to conform to the inside surface of the container with shaft bearing 48a. The retaining ring 52 is then placed to capture the removable flexible membrane 26b between the shaft retainer 56 and the retaining ring 52. A clearance penetration or hole is placed in the removable flexible membrane 26b sufficient to provide clearance for the shaft 54 of the prior art frame supporting apparatus 60 to pass into the shaft retainer 56. The prior art frame supporting apparatus 60 is then placed into the container with shaft bearing 48a. The top of the removable flexible membrane 26b is held in place by passing between the top edge of the container with shaft bearing 48a and the prior art frame supporting apparatus 60. The removable flexible membrane 26b is then extended through the discharge honey gate 50a. The edge of the removable flexible membrane 26b is rolled over the discharge honey gate 50a and held in position by the outlet retaining ring 36b. This prepares the honey extractor for use.

The manner of using this alternate embodiment honey extractor of my invention is the same as the preferred embodiment. The container with shaft bearing 48a and a prior art frame supporting apparatus 60 provides the support and rotation for the honeycomb frames in place of the outer support structure 10 and frame supporting apparatus 12 in the preferred embodiment, FIGS. 1, 2, 3 and 4.

Conclusion, Ramifications and Scope

Accordingly the reader will see that the centrifugal honey extractor of this invention can reduce the cleaning labor involved in honey extracting by employing a disposable liner, which might be a plastic sleeve, or plastic bag with the end removed, to prevent the honey from contacting the outer supporting container. In addition the supporting container can be manufactured using materials that might otherwise contaminate the honey if those materials came into direct contact with the honey. Further employing a disposable liner in the honey extractor has the additional advantages in that:

(a) it permits the supporting container to be manufactured from porous materials;

(b) it permits the supporting container to be constructed to allow it to be disassembled and reassembled without regard to the possibility of leaks causing loss of the honey;

(c) it allows the supporting container to be manufactured from a flat sheet of material to reduce storage space.

In addition a conventional honey extractor can be modified to employ the disposable liner.

Although the description above contains many specificities these should not be construed as limiting the scope of the invention but as merely providing illustrations of some of the presently preferred embodiments of this invention. For example, the supporting container can have other shapes such as oval, rectangular or square; the support members may be solid, other shapes or eliminated entirely if the outer support wall is structurally supportive; the supporting container may be a commercially available product such as a drum, barrel, conventional honey extractor; etc.

Thus the scope of the invention should be determined by the appended claims and their legal equivalents, rather than by the examples given.

I claim:

1. A centrifugal honey extractor comprising:
   (a) a honeycomb frame supporting apparatus;
   (b) a retaining ring device comprising:
      (i) a flexible element of sufficient size and length joined by suitable means at opposite ends such as to form a ring,
   (c) an outer container having adjoining top, side, and bottom walls, said top and bottom walls having an upper and under surface and said side walls having an inside and outside surface;
   (d) a removable flexible membrane of sufficient size removably supported within said outer container including;

(i) a concentric groove of sufficient size located on the underside of the top wall of said outer container so as to be able to engage and retain the side walls of said outer container and retain the flexible membrane located in a mesial position, (ii) a first said retaining ring device of sufficient size mounted internally on the inside adjoining side walls surface of said outer container positioned below said frame supporting apparatus and positioned above the bottom wall inside surface of said outer container, (iii) a second said retaining ring device of sufficient size positioned on the inside surface of said removable flexible membrane positioned below the first retaining ring such that the membrane is secured in a mesial position such as to retain the membrane congruent with the inside surface of said outer container, (iv) an outlet opening in a wall of said outer container of sufficient size and location through which said removable flexible membrane passes, (v) a means of support on the outer surface of said outer container such as to retain and position said removable flexible membrane congruent with said outlet opening, (e) said frame supporting apparatus removably mounted to the upper surface said top wall of said container and extending within said container such that sufficient separation exists between said frame supporting apparatus and said removable flexible membrane;

(f) means for rotating said frame supporting apparatus within said container;

whereby the honey from within the comb is thrown by centrifugal force across the open annular gap between said frame supporting apparatus against said removable flexible membrane and flows through said outlet opening of said outer container and collected and, whereby the said removable flexible membrane and honey ullage can be removed and discarded and whereby the cleaning process has been reduced.

2. A centrifugal honey extractor comprising:

(a) a honeycomb frame having an extension means on at least one end of the top bar thereof, (b) a honeycomb frame supporting apparatus comprising;
   (i) an annular cylinder center support;
   (ii) an lower frame retaining plate having means for retaining said center support in a central location and having a plurality of apertures arcuately spaced around the central aperture through the surfaces of said plate, said apertures being of a dimension and shape such as to receive and retain therein said extension means;
   (iii) an upper frame retaining plate having means for retaining said center support in a central location and having a plurality of radially extending, arcuately spaced slots extending through the surfaces thereof in positions in which at least a portion of each of said slots overlies one of said apertures below, said slots being of a dimension and shape such that the comb frame is inserted vertically therethrough to a position whereby said extension means is securely seated within one of said apertures and the opposite end bar of said frame is retained within the corresponding one of said slots;
   (iv) means for sandwiching said annular cylinder center support with the lower retaining plate and upper retaining plate so as to support the retaining plates in rigid parallel and concentric alignment, (c) a retaining ring device comprising:
   (i) a flexible element of sufficient size and length joined by suitable means at opposite ends such as to form a ring, (d) an outer container having adjoining top, side, and bottom walls, said top and bottom walls having an upper and under surface and said side walls having an inside and outside surface;

(e) a removable flexible membrane of sufficient size removably supported within said outer container including;
   (i) a concentric groove of sufficient size located on the underside of the top wall of said outer container so as to be able to engage and retain the side walls of said outer container and retain said removable flexible membrane located in a mesial position,
   (ii) a first said retaining ring device of sufficient size mounted internally on the inside adjoining side walls surface of said outer container positioned below said frame supporting apparatus and positioned above the bottom wall inside surface of said outer container,
   (iii) a second said retaining ring device of sufficient size positioned on the inside surface of said removable flexible membrane positioned below the first retaining ring such that said removable flexible membrane is secured in a mesial position such as to retain the membrane congruent with the inside surface of said outer container,
   (iv) an outlet opening in a wall of said outer container of sufficient size and location through which said removable flexible membrane passes,
   (iv) a means of support on the outer surface of said outer container such as to retain and position said removable flexible membrane congruent with said outlet opening, (f) said frame supporting apparatus removably mounted to the upper surface said top wall of said container and extending within said container such that a separation exists between said frame supporting apparatus and said removable flexible membrane;

(g) means for rotating said frame supporting apparatus within said container;

whereby the honey from within the comb is thrown by centrifugal force across the open annular gap between said frame supporting apparatus against the membrane and flows through said outlet opening of said outer container and collected and, whereby the membrane and honey ullage can be removed and discarded and whereby the cleaning process has been reduced.

3. A method for extracting honey from honeycomb frames, comprising the steps of:

(a) supporting honeycomb frames so that the top bars are vertical with each side bar resting on a horizontal surface, (b) providing a plurality of supported honeycomb frames arcuately spaced with the top bar apositioned to the outside of the radial array, (c) surrounding said plurality of supported honeycomb frames with a removable flexible membrane positioned with an annular gap from the periphery of said plurality of supported honeycomb frames and said removable flexible membrane, (d) supporting said removable flexible membrane to secure an annular gap between said removable flexible membrane and said plurality of supported honeycomb frames, (e) supporting said removable flexible membrane to secure a neck opening in the said removable flexible membrane located below the said plurality of supported honeycomb frames, (f) rotating said plurality of supported honeycomb frames around the axis of said radial array by conventional means, whereby the honey from within the comb is extracted by centrifugal force and thrown across the open annular gap between the periphery of said plurality of supported honeycomb frames against the wall of said removable flexible membrane and whereby the extracted honey will flow down the said removable flexible membrane and out through the said outlet opening in the membrane where the honey can be collected and whereby the membrane and honey ullage can be removed and discarded and whereby the cleaning process has been reduced.

* * * * *